United States Patent
Wang et al.

[19]

[11] Patent Number: 6,101,816
[45] Date of Patent: Aug. 15, 2000

[54] FLUID STORAGE AND DISPENSING SYSTEM

[75] Inventors: Luping Wang, Brookfield; Glenn M. Tom, New Milford, both of Conn.

[73] Assignee: Advanced Technology Materials, Inc., Danbury, Conn.

[21] Appl. No.: 09/067,393

[22] Filed: Apr. 28, 1998

[51] Int. Cl.[7] ..................................... F17C 7/04
[52] U.S. Cl. ............................................. 62/48.1
[58] Field of Search .................. 62/48.1–50.1, 62/48.4, 45.1

[56] References Cited

U.S. PATENT DOCUMENTS

| | | |
|---|---|---|
| 1,659,263 | 2/1928 | Harris . |
| 1,679,826 | 8/1928 | Jenkins . |
| 2,047,339 | 7/1936 | Thomas . |
| 2,354,283 | 7/1944 | St. Clair . |
| 2,502,588 | 4/1950 | Preston et al. ........................... 62/48.1 |
| 2,553,486 | 5/1951 | Thomas ................................... 62/48.1 |
| 2,615,287 | 10/1952 | Senesky . |
| 2,707,484 | 5/1955 | Rush ........................................ 62/48.1 |
| 2,793,504 | 5/1957 | Webster . |
| 3,388,962 | 6/1968 | Baumann et al. . |
| 3,590,860 | 7/1971 | Stenner . |
| 3,699,998 | 10/1972 | Baranowski, Jr. . |
| 3,791,412 | 2/1974 | Mays . |
| 3,972,346 | 8/1976 | Wormser . |
| 3,994,674 | 11/1976 | Baumann et al. . |
| 4,173,986 | 11/1979 | Martin . |
| 4,793,379 | 12/1988 | Eidsmore . |
| 4,836,242 | 6/1989 | Coffre et al. . |
| 5,230,359 | 7/1993 | Ollivier . |
| 5,233,837 | 8/1993 | Callahan .................................. 62/606 |
| 5,409,526 | 4/1995 | Zheng et al. ............................. 96/132 |
| 5,518,528 | 5/1996 | Tom et al. ................................ 95/95 |
| 5,566,713 | 10/1996 | Lhomer et al. . |
| 5,645,192 | 7/1997 | Amidzich . |
| 5,673,562 | 10/1997 | Friedt ..................................... 62/48.1 |
| 5,678,602 | 10/1997 | Cannet et al. . |
| 5,685,159 | 11/1997 | Kooy et al. ............................ 62/50.1 |
| 5,901,557 | 5/1999 | Grayson ................................. 62/45.1 |

*Primary Examiner*—William Doerrler
*Attorney, Agent, or Firm*—Oliver Zitzmann; Steven J. Hultquist

[57] ABSTRACT

A fluid storage and dispensing system comprising a vessel for holding a fluid at a desired pressure. The vessel has a pressure regulator associated with a port of the vessel, and set at a predetermined pressure. A dispensing assembly, e.g, including a flow control means such as a valve, is arranged in gas/vapor flow communication with the regulator, whereby the opening of the valve effects dispensing of gas/vapor from the vessel. The fluid in the vessel may be constituted by a liquid which is confined in the vessel at a pressure in excess of its liquefaction pressure at prevailing temperature conditions, e.g., ambient (room) temperature. A phase separator such as a gas/vapor-permeable liquid-impermeable membrane, may be associated with the regulator, as a barrier to flow of liquid into the regulator, when the contained fluid in the vessel is in a liquid state.

75 Claims, 2 Drawing Sheets

FLUID STORAGE AND DISPENSING SYSTEM

BACKGROUND OF THE INVENTION

1. Field Of The Invention

This invention relates to a fluid storage and gas dispensing system which may be utilized to store high pressure liquid or other fluid, for dispensing of gas from the system for use in an application such as the manufacture of semiconductor products, such as semiconductor devices and materials.

2. Description of the Related Art

In a wide variety of industrial processes and applications, there is a need for a reliable source of process fluid(s).

Such process and application areas include semiconductor manufacturing, ion implantation, manufacture of flat panel displays, medical intervention and therapy, water treatment, emergency breathing equipment, welding operations, space-based delivery of liquids and gases, etc.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite. The arsine is subsequently dispensed by heating the zeolite to an elevated temperature of up to about 175° C. for sufficient time to release the arsine from the zeolite material.

The method disclosed in the Knollmueller patent is disadvantageous in that it requires the provision of heating means for the zeolite material, to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency, as well as safety concerns.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is subsequently required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, which overcomes the above-discussed disadvantages of the gas supply process disclosed in the Knollmueller patent. The gas storage and dispensing system of the Tom et al. patent comprises an adsorption-desorption apparatus, for storage and dispensing of a gas, e.g., a hydride gas, halide gas, organometallic Group V compound, etc. The gas storage and dispensing vessel of the Tom et al. patent reduces the pressure of stored sorbate gases by reversibly adsorbing them onto a carrier sorbent medium such as a zeolite or activated carbon material.

More specifically, such storage and dispensing system comprises: a storage and dispensing vessel constructed and arranged for holding a solid-phase physical sorbent medium, and for selectively flowing gas into and out of said vessel; a solid-phase physical sorbent medium disposed in said storage and dispensing vessel at an interior gas pressure; a sorbate gas physically adsorbed on the solid-phase physical sorbent medium; a dispensing assembly coupled in gas flow communication with the storage and dispensing vessel, and constructed and arranged to provide, exteriorly of the storage and dispensing vessel, a pressure below said interior pressure, to effect desorption of sorbate gas from the solid-phase physical sorbent medium, and gas flow of desorbed gas through the dispensing assembly; wherein the solid-phase physical sorbent medium is devoid of trace components such as water, metals, and oxidic transition metal species (e.g., oxides, sulfites and/or nitrates) which would otherwise decompose the sorbate gas in the storage and dispensing vessel.

By the elimination of such trace components from the solid-phase physical sorbent medium, the decomposition of the sorbate gas after 1 year at 25° C. and interior pressure conditions is maintained at extremely low levels, e.g., so that not more than 1–5% by weight of the sorbate gas is decomposed.

The storage and dispensing vessel of the Tom et al. patent thus embodies a substantial advance in the art, relative to the prior art use of high pressure gas cylinders. Conventional high pressure gas cylinders are susceptible to leakage from damaged or malfunctioning regulator assemblies, as well as to rupture or other unwanted bulk release of gas from the cylinder if internal decomposition of the gas leads to rapid increasing interior gas pressure in the cylinder.

There is a continuing need in the art to provide improved fluid storage and delivery systems for selective dispensing of gases in a variety of end use applications.

Relative to the state of the art and the invention as described more fully hereinafter, pertinent art includes the following references: U.S. Pat. No. 3,590,860 to Stenner (a manually adjustable regulator valve for a liquid propane cartridge, including a regulator diaphragm and actuating spring assembly); U.S. Pat. No. 4,836,242 to Coffre et al. (a pressure reducer for supplying electronic grade gas, including a bellows and inlet valve, with a solid particles filter disposed between the bellows and a low pressure outlet); U.S. Pat. No. 5,230,359 to Ollivier (a diaphragm-based pressure regulator for a high pressure gas cylinder, wherein a valve is positioned in the regulator for adjustably throttling the flow of pressurized fluid); U.S. Pat. No. 3,699,998 to Baranowski, Jr. (a calibratable pressure regulator in which leaf spring fasteners are utilized to retain the regulator components in position); U.S. Pat. No. 3,791,412 to Mays (a pressure reducing valve for high pressure gas containers, including a pair of valve elements for dispensing low pressure throttled fluid); U.S. Pat. No. 3,972,346 to Wormser (pressure regulator featuring a U-ring seal poppet assembly); U.S. Pat. No. 4,793,379 to Eidsmore (button-operated valve for main shut-off and flow control of a pressurized gas cylinder, using magnetic actuation of valve components); U.S. Pat. No. 2,615,287 to Senesky (a gas pressure regulator including diaphragm and diaphragm-clamping member elements); U.S. Pat. No. 4,173,986 to Martin (pressurized gas flow control valve including pressure regulator and responsive poppet valve structure); U.S. Pat. No. 3,388,962 to Baumann et al. (pressurized gas fuel metering device including sintered metal pellet flow element); U.S. Pat. No. 1,679,826 to Jenkins (fluid pressure regulator for high pressure container, utilizing diaphragm element and gas filtering means comprising a felt strip); U.S. Pat. No. 2,354,283 to St. Clair (fluid pressure regulator for liquefied petroleum gas tanks, comprising pressure actuated diaphragm with flow restrictor structure to minimize vibration); U.S. Pat. No. 5,566,713 to Lhomer et al. (gas flow control dispensing assembly including piston-type pressure regulator and block reducer/regulator means); U.S. Pat. No. 5,645,192 to Amidzich (valve assembly for relieving excess gas pressure in a container, comprising sealing ring/spring assembly); U.S. Pat. No. 5,678,602 to Cannet et al. (gas control and dispensing assembly for a pressurized gas tank, including reducer and regulator means with indexed flow-meter valve); U.S. Pat. No. 2,793,504 to Webster (valve for pressurized fluid container including pressure reducer and regulator and spring bias closure means); U.S. Pat. No. 1,659,263 to Harris (regulator for pressurized gas cylinder including a diaphragm and anti-friction washer between diaphragm and annular seat of regulator); U.S. Pat. No. 2,047,339 to Thomas (liquefied petroleum gas storage apparatus including flow control unit and leakage prevention valve); and U.S. Pat. No. 3,994,674 to Baumann et al. (detachable burner assembly for container of pressurized liquefied combustible gas, including a regulator valve assembly).

It is accordingly an object of the present invention to provide an improved fluid storage and dispensing system for the selective dispensing of gases, which offers significant advantages in cost, ease of use, and performance characteristics.

There is a continuing need in the art to provide improved fluid storage and delivery systems for selective dispensing gases in a variety of end use applications.

Other objects and advantages of the invention will be more fully apparent from the ensuing disclosure and appended claims.

SUMMARY OF THE INVENTION

The present invention relates to a system for storage and dispensing of a fluid, for use in applications such as the manufacture of semiconductor products.

The fluid storage and gas dispensing system of the invention comprises a storage and dispensing vessel constructed and arranged for holding a liquid whose vapor constitutes the fluid to be dispensed. The fluid is contained in the storage and dispensing vessel, e.g., at a pressure at which the fluid is in a liquid state. The storage and dispensing vessel includes an outlet port and is equipped with a dispensing assembly coupled to the outlet port, which may for example comprise a valve head assembly including a dispensing valve and an outlet for selective discharge of gas deriving from the liquid in the vessel.

A fluid pressure regulator is associated with the outlet port and may constitute part of a pressure regulator/phase separator assembly associated with the outlet port, e.g., at the neck of the vessel, to retain fluid in the vessel and, when the fluid is in liquid form, to prevent liquid from leaking to the dispensing valve and outlet. The pressure regulator and the optionally included phase separator are arranged to lie in the flow path of fluid dispensed from the vessel through the outlet port. The pressure regulator and the optionally included phase separator may be disposed interiorly or exteriorly of the vessel. Preferably, such elements are interiorly disposed, to minimize the possibility of impact and environmental exposure in use, and to minimize the leak path of the contained fluid from the vessel. When the pressure regulator and optionally included phase separator are interiorly disposed, the vessel may utilize a single weld or seam at the outlet port, to seal the vessel.

The phase separator may suitably comprise a porous membrane which is permeable to vapor or gas deriving from the liquid, but is not permeable to the liquid, and the phase separator is preferably disposed in a protective mode upstream of the pressure regulator so that when the contained fluid in the vessel is a liquid, the liquid is prevented from entering and interfering with the function of the pressure regulator in maintaining the liquid in the vessel, and preventing egress of liquid from the vessel.

The regulator is a flow control device, which can be set at a predetermined pressure level, to dispense gas or vapor from the cylinder at such pressure level. The pressure level set point may be superatmospheric, subatmospheric or atmospheric pressure, depending on the dispensing conditions, and the mode of gas discharge from the vessel.

The fluid storage and dispensing vessel of the invention may be formed in the manner of a conventional high pressure gas cylinder, with an elongate main body portion having a neck of reduced cross-sectional area relative to the main body cross-section of the vessel. The vessel may in such conformation be amenable to conventional manufacture wherein the vessel is cleaned and then installed with a valve head assembly including a valve (manual or automatic) and associated pressure and flow control elements, in a manifold arrangement.

Although liquid is preferred as the contained fluid medium in the use of the fluid storage and gas dispensing system of the invention, it is also possible that high-pressure gas may be utilized as the fluid medium to be stored and selectively dispensed.

The storage and dispensing vessel may be readily filled by setting the fluid pressure regulator at a suitably low pressure level so that the gas or vapor is at a pressure below the pressure regulator set point, using a conventional pressure regulator including a poppet element which may be biased with a biasing element such as a spring biasing element to a closed position, and which responds to pressure above the set point pressure by remaining closed, but which responds to pressure below the set point pressure by opening and allowing fluid flow therethrough.

Accordingly, the fill operation may be carried out to load the vessel with fluid to be stored and subsequently dispensed, by establishing an interior pressure level in the vessel at which the poppet element of the pressure regulator disengages from its seat, thereby allowing gas to flow into the vessel, in reverse flow fashion to the dispensing mode of the system. In this manner, the vessel may be fabricated with only one port, which thus functions to permit egress of gas from the vessel for dispensing, as well as permitting filling of the vessel with the fluid in the first instance, through the single port.

Alternatively, the vessel could be configured with dual fluid flow ports, which can accommodate separate fill and dispensing lines. For example, the dispensing port may be located at the neck of the vessel and be associated with a conventional valve head assembly, while the fill port may be provided at another location on the vessel structure.

The vessel of the invention may be utilized for storage and dispensing of any suitable fluids, such as hydride fluids, e.g., arsine, phosphine, stibine, silane, etc., for use in semiconductor manufacturing operations.

In use, a dispensing valve may be provided as part of the dispensing assembly associated with the port of the vessel, and such valve may be opened, manually or automatically, to permit gas to flow through the porous membrane or phase separator element, when present, and through the regulator for discharge of the gas from the fluid storage and dispensing system, and subsequent flow to a downstream process system, such as an ion implantation apparatus, chemical vapor deposition chamber, semiconductor equipment cleaning station, etc.

In another aspect, the present invention relates to a method for storage and dispensing of a fluid, comprising:

containing the fluid in a confined state against a fluid pressure regulator in a fluid flow path closed to fluid flow downstream of the fluid pressure regulator; and selectively dispensing the confined fluid by opening the fluid flow path to fluid flow downstream of the fluid pressure regulator, and discharging fluid at a rate determined by the fluid pressure regulator, optionally wherein the contained fluid is a liquid and the fluid during dispensing is phase-separated upstream of the fluid pressure regulator, to permit only gas to be discharged from the fluid contained in a confined state.

Other aspects, features and embodiments in the invention will be more fully apparent from the ensuing disclosure and appended claims.

DETAILED DESCRIPTION OF THE INVENTION, AND PREFERRED EMBODIMENTS THEREOF

The present invention is based on the discovery that a fluid storage and dispensing system, of a type presenting an alternative to the fluid storage and dispensing system of Tom et al. U.S. Pat. No. 5,518,528, may be easily fabricated by disposing a fluid pressure regulator between a confined liquid volume and a gas dispensing assembly including a gas flow control element such as a gas flow shut off valve, mass flow controller, or the like.

Ancillary to this discovery is the finding that the fluid pressure regulator may be advantageously interiorly disposed in the fluid storage and dispensing vessel, so that it is protected by the vessel, e.g., cylinder casing or housing, from impact, environmental exposure and damage.

Although the fluid pressure regulator is preferably interiorly disposed in the fluid storage and dispensing vessel, it is possible to dispose such element exteriorly of the vessel in the broad practice of the invention. The invention therefore broadly contemplates the provision of interiorly as well as exteriorly disposed fluid pressure regulator devices associated with the fluid flow port of the vessel.

The fluid pressure regulator may be of any suitable type, e.g., the SR4 series set pressure regulator commercially available from Integrated Flow Systems, Inc. As discussed in the Summary of the Invention section hereof, the fluid pressure regulator may be of a poppet valve type, comprising a poppet element which is biased to a seat structure to prevent flow at a pressure above a set point value.

The set point may be a "native" or fixed set point device, or the device may comprise a variable set point (adjustable) device. Preferably, the fluid pressure regulator is a variable, adjustable device as regards its set point pressure. The fluid pressure regulator may by way of example be set to an appropriate level, e.g., 700 Torr, to provide flow of dispensed fluid from the storage and dispensing vessel at such set point pressure level when the dispensing assembly associated with the fluid flow port of the vessel is opened to flow, such as by opening of a flow control valve of the dispensing assembly.

The fluid medium in the fluid storage and dispensing vessel may be any suitable fluid medium at any appropriate fluid storage conditions, e.g., a high pressure gas or alternatively a liquid, at the set point pressure determined by the fluid pressure regulator, as the source of the gas to be dispensed. Thus, the gas source in the system may be a high pressure gas or a liquefied gas.

Optionally and desirably, a phase separator is utilized to prevent liquid leakage across the regulator valve seat when the gas source is a high pressure liquid. The phase separator may be of any suitable form, but preferably comprises a porous membrane which is permeable to gas or vapor of the contained liquid, but is impermeable to the liquid phase. Suitable materials for such phase separator permeable membrane include various polymeric material films of appropriate porosity and permeability characteristics, and so-called "breatheable" fabrics such as those commercially manufactured by Gore-Tex Corporation under the trademark "Gore-Tex."

The pressure regulator and the phase separator may be utilized in combination with one another in an assembly which may be interiorly disposed in the fluid storage and dispensing vessel or disposed exteriorly thereof. Preferably, such fluid pressure regulator and phase separator assembly is interiorly disposed in the storage and dispensing vessel.

The fluid utilized in the fluid storage and dispensing vessel of the invention may comprise any suitable fluid, such as for example a hydride fluid for semiconductor manufacturing operations. Examples of hydride fluids of such type include arsine, phosphine, stibine, silane, chlorosilane, and diborane. Other fluids useful in semiconductor manufacturing operations may be employed, such as boron trifluoride, halide etchants and cleaning reagents, etc.

The fluid storage and dispensing vessel of the invention may be readily constructed utilizing conventional fluid pressure regulator devices. In relation to the sorbent-based gas storage and dispensing system described in U.S. Pat. No. 5,518,528, the fluid storage and dispensing vessel of the present invention provides a significantly greater fluid storage capacity, when the fluid is in the liquid phase.

By way of example, for a sorbent-based gas storage and dispensing system of the type shown and described in U.S. Pat. No. 5,158,528, using a "JY" cylinder as the storage and dispensing vessel, and containing a physical sorbent material having sorptive affinity for the gas to be dispensed, typically delivers, in the case of arsine gas, on the order of about 0.5 kilogram of gas.

In the corresponding vessel of the fluid storage and gas dispensing system of the present invention, one liter of liquid arsine can be stored and 1.8 kilograms of arsine gas can be dispensed therefrom.

The fluid storage and dispensing system of the present invention permits high purity dispensing of the fluid, free of potential contaminants or impurities characteristically present in sorbent materials utilized in sorbent-based storage and dispensing systems of the prior art.

Further, the fluid storage and dispensing system of the present invention affords a high level of safety in the deployment of fluids, in that the storage and dispensing vessel may be fabricated with an interiorly disposed pressure regulator and optional phase separator, and the seam associated with the fluid flow port of the vessel will constitute the only leak path in the otherwise seamless vessel construction. Further, in the case of a conventional fluid cylinder, because of the relative small size of the cylinder neck in contrast to the cross section of the body of the vessel, a minimal leak path for ingress or egress of gas is provided, which can be easily rendered leak-tight, by brazing, welding, adhesively sealing with a highly fluid impermeable sealant, etc.

Additionally, as mentioned, it is feasible to construct the fluid storage and dispensing vessel with only a single fluid flow port. If the fluid pressure regulator is set at a suitable pressure level, e.g., 700 Torr, then the vessel may be lowered in temperature to the point that the gas vapor pressure (of the fluid to be dispensed) is below the regulator set point. Under these conditions the poppet element of the regulator will disengage from its seat and allow gas to flow into the storage vessel from an exterior source.

Figure 1:
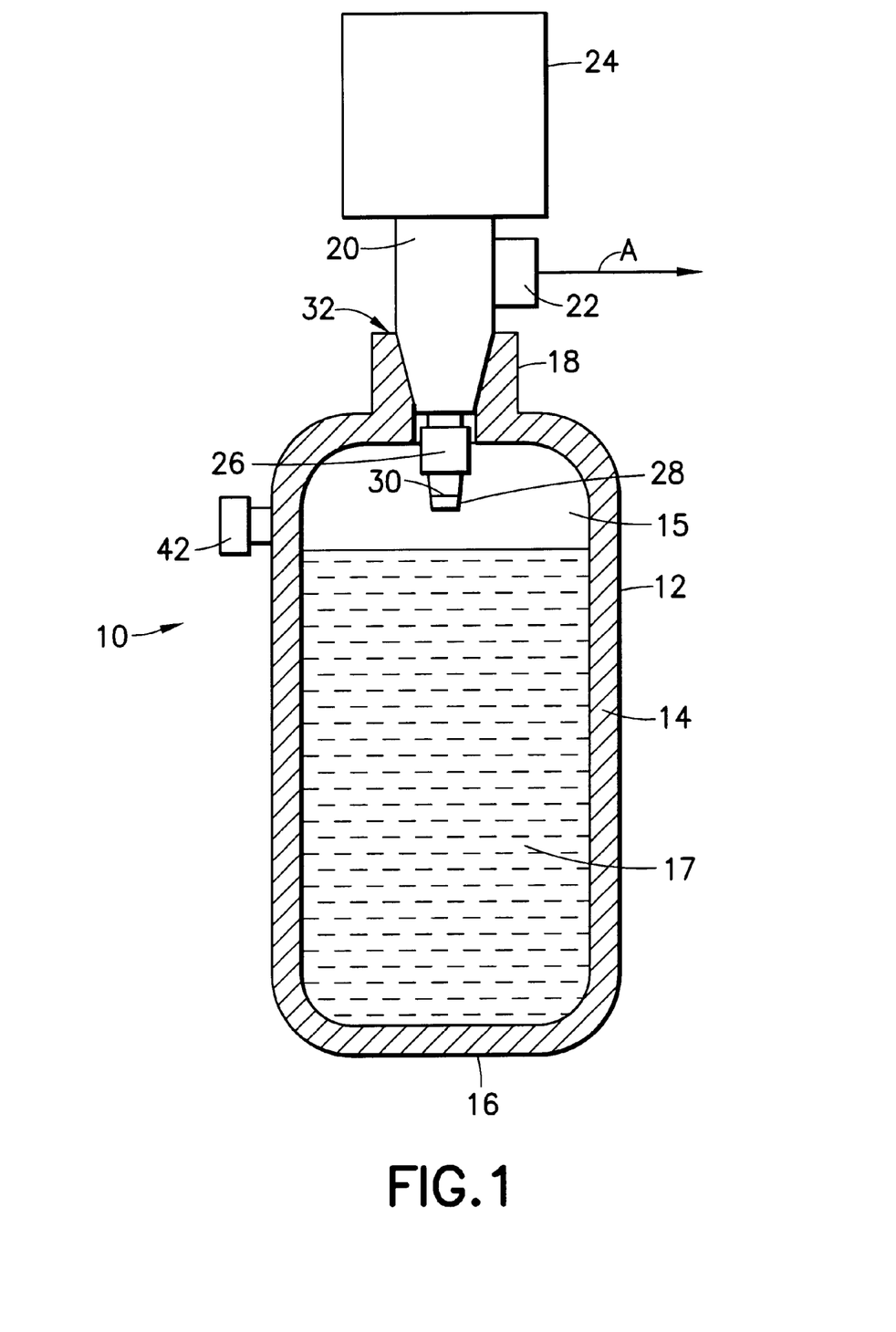
FIG. 1 is a schematic cross-sectional elevation view of a fluid storage and dispensing system according to one embodiment of the present invention.

Referring now to the drawings, FIG. 1 is a schematic cross-sectional, elevation view of a liquid storage and gas dispensing system 10 according to one embodiment of the present invention.

The fluid storage and gas dispensing system 10 includes a storage and dispensing vessel 12 including a cylindrical side wall 14, a bottom floor 16 and an upper neck portion 18, defining an enclosed interior volume 15 holding the liquid 17. Liquid 17 may comprise any suitable liquid such as a liquid hydride for use in semiconductor manufacturing operations. Illustrative hydrides include arsine, phosphine, stibine, silane, diborane, etc. The liquid 17 is maintained under sufficient pressure in vessel 12 so as to remain in a liquid phase.

Disposed in the upper neck portion 18 of the vessel 12 is a valve head assembly comprising valve 20 communicating with valve outlet 22, from which vapor is dispensed from the vessel in the direction indicated by arrow A.

The valve 20 is shown with an associated actuator 24, which may be of any suitable type (electrical, pneumatic, etc.) as desired in the given end use application of the invention. Alternatively, the valve 20 may be manually actuated, or provided with other flow control means.

The valve 20 is joined in gas flow communication with the pressure regulator 26, which is of a conventional type employing a poppet element which may for example be spring biased in a closed condition and wherein the poppet is subject to displacement when the pressure differential across the poppet element exceeds a certain level. The pressure regulator 26 may for example be set to a subatmospheric, atmospheric or superatmospheric pressure value, e.g., 700 Torr. The specific pressure level is chosen with respect to the liquid or other fluid contained in the vessel, as appropriate to the storage and dispensing operation.

Coupled with the pressure regulator 26 is a phase separator 28 including a membrane element 30, which is permeable to gas or vapor deriving from the liquid 17, but is impermeable to the liquid itself.

The vapor/gas-permeable, liquid-impermeable membrane may be formed of any suitable material which transmits only the gas or vapor from the liquid but precludes liquid flow therethrough. The membrane may in practice be formed of a wide variety of potentially useful materials, including, for example, polypropylene, polyvinylidene fluoride, polytetrafluoroethylene, polyfluoroacetate, silicone, and surface-treated glass fabrics. One preferred useful material comprises polyvinylidene fluoride "breatheable" fabrics such as those commercially marketed under the trademark "Gore-Tex®" (Gore-tex Corporation). Other commercially available materials for use as membrane phase separator materials include Noryl film (General Electric Company, Pittsfield, Mass.).

In use of the liquid storage and gas dispensing system of FIG. 1, the liquid is stored at a predetermined pressure ensuring its liquidity. For this purpose, the pressure regulator 26 is set at a predetermined level ensuring the appropriate interior pressure in the interior volume 15 of the vessel. The liquid-impermeable, gas/vapor-permeable membrane 30 ensures that no liquid will flow into the gas regulator 26, even if the vessel is tilted from the vertical attitude shown in FIG. 1.

When it is desired to dispense gas from the vessel 12, the valve actuator 24 is actuated to open valve 20, thereby permitting gas or vapor deriving from the liquid to flow through the permeable membrane 30, the pressure regulator 26 and the valve 20, for egress from the valve head dispensing assembly through outlet 22.

The opening of the valve 20 effects a reduction of the pressure on the discharge side of the permeable membrane 30 and causes permeation of vapor deriving from the liquid through the membrane, for discharge. At the same time, the fluid pressure regulator will maintain the pressure of the gas being dispensed at the set point pressure level.

The vessel 12 in the FIG. 1 embodiment may as shown be equipped with a separate fill port 42 (in relation to the fluid flow port at the neck of the vessel), and such separate fill port may be coupled to a source of liquid for filling of the vessel.

Alternatively, the vessel may simply be provided with one neck opening, with the pressure regulator set at an appropriate temperature level for filling. In the filling operation, the vessel may be chilled, as by placement of the vessel in a cryostat or coolant bath, to reduce the temperature of the vessel below the point of the predetermined pressure established by the pressure regulator. The fluid pressure regulator then will have a gas pressure in the interior volume 15 of the vessel which is below the set point of the regulator, thereby allowing the poppet element of the pressure regulator to disengage from its seat and allow ingress of fluid to the vessel, for subsequent storage of the liquid therein.

Figure 2:
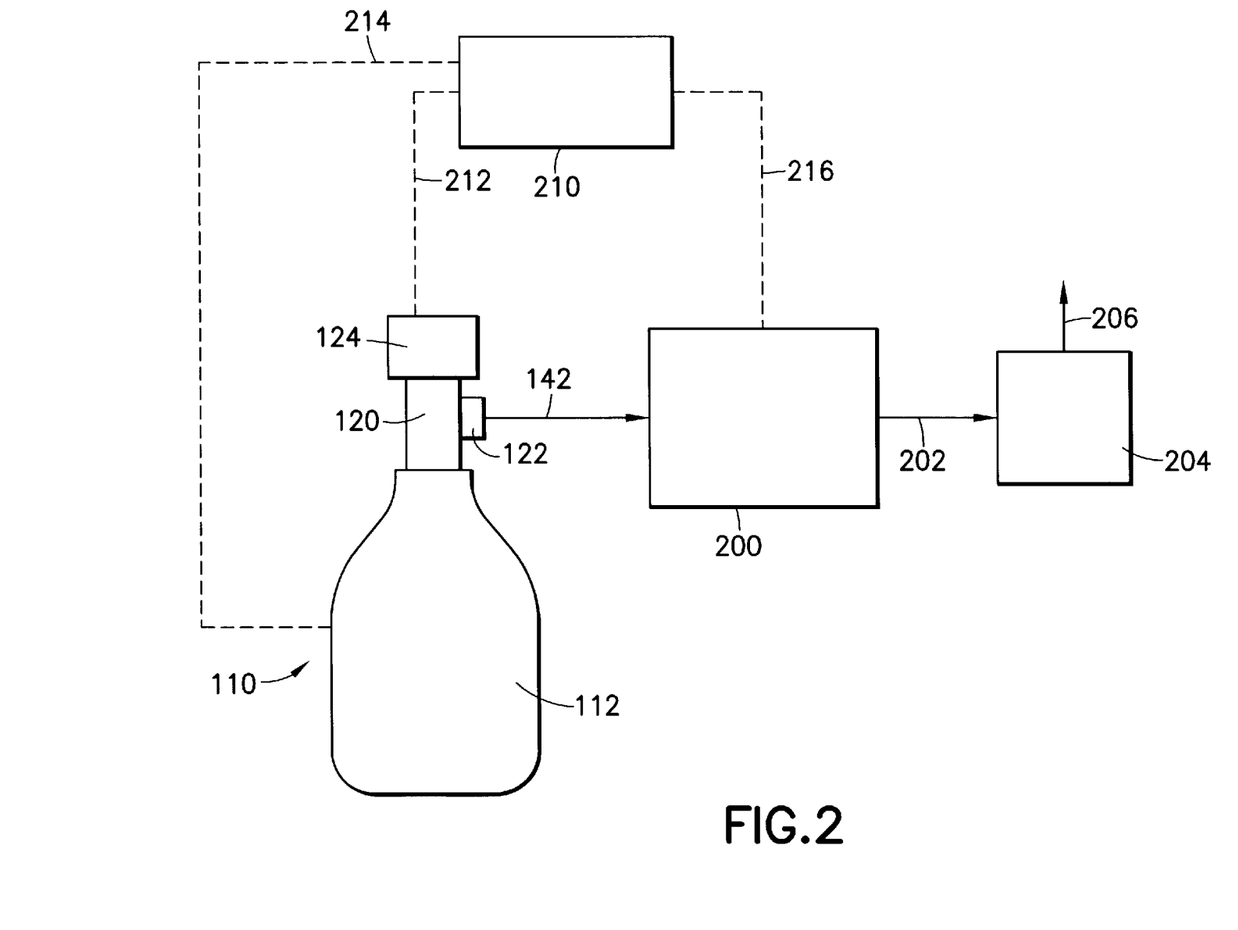
FIG. 2 is a schematic representation of a semiconductor manufacturing facility utilizing a fluid dispensed from a storage and dispensing system of the type shown in FIG. 1, in accordance with a further embodiment of the invention.

FIG. 2 is a schematic representation of a semiconductor manufacturing system utilizing a fluid storage and dispensing system 110 in accordance with the present invention. The fluid storage and dispensing system 110 includes a generally cylindrical vessel 112 constructed generally along the lines of vessel 12 in FIG. 1. The vessel holds liquid at a predetermined pressure. The valve head assembly comprises a valve 120 with an actuator 124 being arranged to selectively actuate the valve and effect discharge of gas from the vessel in line 142.

The valve actuator 124 is controlled by central processor unit 210, which may comprise a computer or microprocessor control apparatus, coupled in controlling relationship with the valve actuator 124 by means of signal transmission line 212.

The central processor unit 210 may be constructed and arranged to actuate the valve according to a cycle time program. Alternatively, the central processor unit 210 may monitor a process condition in the semiconductor manufacturing facility 200 by means of process condition signal transmission line 216 which conveys a signal indicative of a given process condition to the central processor unit, causing the unit to responsively actuate the valve actuator 124 to a corresponding extent, to modulate the gas flow in line 142 in proportion to the needs of the semiconductor manufacturing facility.

The central processor unit 210 may also receive a signal correlative of the temperature of the vessel in signal transmission line 214, which may be joined to a thermal sensor or embedded thermocouple associated with vessel 112, to compensate the flow of fluid in line 142 in relation to the temperature of vessel 112.

The semiconductor manufacturing facility 200 may comprise any suitable arrangement of semiconductor process equipment for the production of semiconductor materials or devices, or products containing such materials or devices.

For example, the semiconductor manufacturing facility 200 may comprise an ion implantation system, lithotracks, chemical vapor deposition reactor and associated reagent supply and vaporization equipment (including liquid delivery equipment, bubblers, etc.), etch unit, cleaning apparatus, etc.

In one particular embodiment of the present invention, a liquid hydride fluid is maintained under pressure in vessel 112 and gas derived therefrom is selectively dispensed in line 142 to the semiconductor manufacturing facility 200 comprising an ion implantation chamber. The dispensed gas, together with suitable carrier and/or diluent gas(es), is subjected to ionization, and the resulting ion species are implanted in a substrate such as a semiconductor device precursor structure or subassembly.

The semiconductor manufacturing facility 200 subsequent to use of the dispensed gas, discharges an effluent gas stream in line 202 which may be flowed to an effluent gas treatment system 204, for treatment and discharge of final purified effluent in line 206.

It will be recognized that the semiconductor manufacturing facility may be widely varied and configured, as for example to employ a multiplicity of process gases which may be dispensed from corresponding individual fluid storage and dispensing vessels constructed and operated in accordance with the present invention.

It will also be recognized that the fluid storage and dispensing apparatus of the present invention provides a highly effective and readily fabricated means for high capacity storage and delivery of fluids such as arsine, which are able to be liquefied under pressure without undue effort or expense.

Further, by interiorly disposing a fluid pressure regulator in the interior volume of a fluid storage and dispensing vessel, the vessel may be fabricated with only a single seam at its neck portion as a potential leakage path for ingress or egress of fluid species. Accordingly, the vessel may be readily fabricated, and in use, the interiorly disposed gas pressure regulator is protected from impact as well as environmental exposure, which could otherwise deleteriously affect the structural integrity or operation of the vessel, as well as constituting an additional potential leak path for the storage and dispensing vessel.

Thus, while the invention has been illustratively described herein with reference to specific elements, features and embodiments, it will be recognized that the invention is not thus limited in structure or operation, but that the invention is to be broadly construed consistent with the disclosure herein, as comprehending variations, modifications and embodiments as will readily suggest themselves to those of ordinary skill in the art.

What is claimed is:

1. A fluid storage and dispensing system, comprising:
   a fluid storage and dispensing vessel enclosing an interior volume for holding a fluid, wherein the vessel includes a fluid flow port;
   a fluid dispensing assembly coupled in fluid flow communication with the port;
   a fluid pressure regulator associated with the port, and arranged to maintain a predetermined pressure of gas discharged from the vessel, deriving from fluid in the interior volume of the vessel;
   the fluid dispensing assembly comprising a flow control element which is selectively actuatable to flow gas, deriving from the fluid in the interior volume of the vessel, through the fluid pressure regulator and fluid dispensing assembly, for discharge of the gas from the vessel;
   so that gas during said discharge flows through the fluid pressure regulator prior to flow through the flow control element.

2. A fluid storage and dispensing system according to claim 1, wherein the fluid pressure regulator is interiorly disposed in the interior volume of the vessel.

3. A fluid storage and dispensing system according to claim 1, wherein the fluid pressure regulator has operatively associated therewith a phase separator, for preventing flow of liquid through the fluid pressure regulator.

4. A fluid storage and dispensing system according to claim 3, wherein the phase separator comprises a gas-permeable, liquid-impermeable membrane.

5. A fluid storage and dispensing system according to claim 1, wherein the dispensing assembly includes a flow control valve operatively coupled with a valve actuator therefor, and an automatic controller for actuating the valve actuator to initiate adjustment of the valve for controlled discharge flow of gas deriving from fluid in the vessel.

6. A fluid storage and dispensing system, comprising:
   a fluid storage and dispensing vessel enclosing an interior volume for holding a fluid, wherein the vessel includes a fluid flow port;
   a fluid dispensing assembly coupled in fluid flow communication with the port;
   a fluid pressure regulator associated with the port, and arranged to maintain a predetermined pressure of gas discharged from the vessel, deriving from fluid in the interior volume of the vessel;
   the fluid dispensing assembly comprising a flow control element which is selectively actuatable to flow gas, deriving from the fluid in the interior volume of the vessel, through the fluid pressure regulator and fluid dispensing assembly for discharge of the gas from the vessel; and
   a liquid contained in the vessel interior volume selected from the group consisting of liquefied hydride gases and liquefied acid gases.

7. A fluid storage and dispensing system, comprising:
   a fluid storage and dispensing vessel enclosing an interior volume for holding a fluid, wherein the vessel includes a fluid flow port;
   a fluid dispensing assembly coupled in fluid flow communication with the port;

a fluid pressure regulator associated with the port, and arranged to maintain a predetermined pressure of gas discharged from the vessel, deriving from fluid in the interior volume of the vessel;

the fluid dispensing assembly comprising a flow control element which is selectively actuatable to flow gas, deriving from the fluid in the interior volume of the vessel, through the fluid pressure regulator and fluid dispensing assembly, for discharge of the gas from the vessel; and wherein the liquid hydride comprises a hydride species selected from the group consisting of arsine, phosphine, stibine, silane and diborane.

8. A fluid storage and dispensing system, comprising:

a fluid storage and dispensing vessel enclosing an interior volume for holding a fluid, wherein the vessel includes a fluid flow port;

a fluid dispensing assembly coupled in fluid flow communication with the port;

a fluid pressure regulator associated with the port, and arranged to maintain a predetermined pressure of gas discharged from the vessel, deriving from fluid in the interior volume of the vessel;

the fluid dispensing assembly comprising a flow control element which is selectively actuatable to flow gas, deriving from the fluid in the interior volume of the vessel, through the fluid pressure regulator and fluid dispensing assembly, for discharge of the gas from the vessel; and a liquid contained in the vessel interior volume selected from the group consisting of arsine, boron trichloride and boron trifluoride.

9. A fluid storage and gas dispensing system, comprising:

a storage and dispensing vessel constructed and arranged for holding a liquid whose vapor constitutes the fluid to be dispensed, wherein the fluid is contained in the storage and dispensing vessel, at a pressure at which the fluid is in a liquid state;

the storage and dispensing vessel including a fluid flow port;

a dispensing assembly coupled to the outlet port; and a fluid pressure regulator/phase separator assembly interiorly disposed in the vessel, to retain liquid in the vessel and to prevent liquid from flowing into the dispensing assembly during gas dispensing; and a controller for selectively actuating the dispensing assembly to effect flow of gas deriving from the liquid in the vessel, through the fluid regulator/phase separator assembly and the dispensing assembly, for discharge of the gas from the system;

so that gas during said discharge flows through the fluid pressure regulator prior to flow through the flow control element.

10. A fluid storage and gas dispensing system, comprising:

a fluid storage and dispensing vessel enclosing an interior volume for holding a fluid, wherein the vessel includes a fluid flow port;

a fluid dispensing assembly coupled in fluid flow communication with the port;

a fluid pressure regulator associated with the port, and arranged to maintain a predetermined pressure of gas discharged from the vessel, deriving from fluid in the interior volume of the vessel;

the fluid dispensing assembly comprising a flow control element which is selectively actuatable to flow gas, deriving from the fluid in the interior volume of the vessel, through the fluid pressure regulator and fluid dispensing assembly, for discharge of the gas from the vessel; and having a single seam at the fluid flow port.

11. A fluid storage and gas dispensing system according to claim 9, wherein the phase separator comprises a porous membrane which is permeable to gas deriving from the liquid, but is not permeable to the liquid, disposed upstream of the pressure regulator so that the liquid is prevented from entering and interfering with the function of the fluid pressure regulator in maintaining the liquid in the vessel, and preventing egress of liquid from the vessel.

12. A fluid storage and gas dispensing system according to claim 9, wherein the vessel has dual fluid flow ports.

13. A fluid storage and gas dispensing system, comprising:

a fluid storage and dispensing vessel enclosing an interior volume for holding a fluid, wherein the vessel includes a fluid flow port;

a fluid dispensing assembly coupled in fluid flow communication with the port;

a fluid pressure regulator associated with the port, and arranged to maintain a predetermined pressure of gas discharged from the vessel, deriving from fluid in the interior volume of the vessel;

the fluid dispensing assembly comprising a flow control element which is selectively actuatable to flow gas, deriving from the fluid in the interior volume of the vessel, through the fluid pressure regulator and fluid dispensing assembly, for discharge of the gas from the vessel; and wherein the vessel contains a hydride fluid selected from the group consisting of arsine, phosphine, stibine, silane and diborane.

14. A semiconductor manufacturing system comprising a semiconductor manufacturing apparatus utilizing a gas, and a source of said gas, wherein said source comprises:

a fluid storage and dispensing vessel enclosing an interior volume for holding a fluid, wherein the vessel includes a fluid flow port;

a fluid dispensing assembly coupled in fluid flow communication with the port;

a fluid pressure regulator associated with the port, and arranged to maintain a predetermined pressure of gas discharged from the vessel, deriving from fluid in the interior volume of the vessel;

the fluid dispensing assembly comprising a flow control element which is selectively actuatable to flow gas, deriving from the fluid in the interior volume of the vessel, through the fluid pressure regulator and fluid dispensing assembly, for discharge of the gas from the vessel, so that gas during said discharge flows through the fluid pressure regulator prior to flow through the flow control element; and a fluid in the interior volume of the fluid storage and dispensing vessel, wherein said fluid is selected from the group consisting of high pressure gases and liquefied gases.

15. A semiconductor manufacturing system according to claim 14, wherein the semiconductor manufacturing apparatus is selected from the group consisting of ion implantation chambers, chemical vapor deposition reactors, lithotracks units, bubblers, liquid delivery units, and cleaning equipment.

16. A method for storage and dispensing of a fluid, comprising:

containing the fluid in a confined state against a fluid pressure regulator in a fluid flow path closed to fluid flow downstream of the fluid pressure regulator by a flow control element in said fluid flow path downstream of said fluid pressure regulator; and selectively dispensing the confined fluid by opening the flow control element in said fluid flow path to cause fluid to flow downstream of the fluid pressure regulator, and discharging fluid, so that fluid during such discharge flows through the fluid pressure regulator prior to flow through the flow control element;

wherein said fluid is maintained in said confined state in an enclosed interior volume of a fluid storage and dispensing vessel having a fluid flow port, and said fluid pressure regulator is associated with the fluid flow port.

17. A method according to claim 16, wherein the contained fluid is a liquid and the fluid during dispensing is phase-separated upstream of the fluid pressure regulator, to permit only gas to be discharged from the fluid contained in a confined state.

18. A method of manufacturing a semiconductor product, comprising:

containing the fluid in a confined state against a fluid pressure regulator in a fluid flow path closed to fluid flow downstream of the fluid pressure regulator by a flow control element in said fluid flow path downstream of said fluid pressure regulator;

selectively dispensing the confined fluid by opening the flow control element in said fluid flow path to cause fluid to flow downstream of the fluid pressure regulator, and discharging fluid, so that fluid during such discharge flows through the fluid pressure regulator prior to flow through the flow control element; and using the discharged fluid in the manufacture of the semiconductor product;

wherein said fluid is maintained in said confined state in an enclosed interior volume of a fluid storage and dispensing vessel having a fluid flow port, and said fluid pressure regulator is associated with the fluid flow port.

19. A method according to claim 18, wherein the use of the discharged fluid comprises ion implantation.

20. A method according to claim 18, wherein the use of the discharged fluid comprises chemical vapor deposition.

21. A fluid storage and dispensing system, comprising:

a fluid storage and dispensing vessel enclosing an interior volume for holding a fluid, wherein the vessel includes a fluid flow port;

a fluid dispensing assembly coupled in fluid flow communication with the port;

a fluid pressure regulator associated with the port, and arranged to maintain a predetermined pressure of gas discharged from the vessel, deriving from fluid in the interior volume of the vessel;

the fluid dispensing assembly comprising a flow control element which is selectively actuatable to flow gas, deriving from the fluid in the interior volume of the vessel, through the fluid pressure regulator and fluid dispensing assembly for discharge of the gas from the vessel;

wherein the fluid pressure regulator is arranged for discharge of the gas from the vessel at a subatmospheric pressure.

22. A fluid storage and dispensing system according to claim 1, wherein the fluid pressure regulator is arranged for discharge of the gas from the vessel at a pressure below 700 Torr.

23. A fluid storage and gas dispensing system according to claim 9, wherein the fluid pressure regulator/phase separator assembly is arranged for discharge of the gas from the system at a subatmospheric pressure.

24. A fluid storage and gas dispensing system according to claim 9, wherein the fluid pressure regulator/phase separator assembly is arranged for discharge of the gas from the system at a pressure below 700 Torr.

25. A semiconductor manufacturing system comprising a semiconductor manufacturing apparatus utilizing a gas, and a source of said gas, wherein said source comprises:

a fluid storage and dispensing vessel enclosing an interior volume for holding a fluid, wherein the vessel includes a fluid flow port;

a fluid dispensing assembly coupled in fluid flow communication with the port;

a fluid pressure regulator associated with the port, and arranged to maintain a predetermined pressure of gas discharged from the vessel, deriving from fluid in the interior volume of the vessel;

the fluid dispensing assembly comprising a flow control element which is selectively actuatable to flow gas, deriving from the fluid in the interior volume of the vessel, through the fluid pressure regulator and fluid dispensing assembly for discharge of the gas from the vessel;

wherein the fluid pressure regulator is arranged for discharge of the gas from the vessel at a subatmospheric pressure.

26. A semiconductor manufacturing system according to claim 14, wherein the fluid pressure regulator is arranged for discharge of the gas from the vessel at a pressure below 700 Torr.

27. A method for storage and dispensing of a fluid, comprising:

containing the fluid in a confined state against a fluid pressure regulator in a fluid flow path closed to fluid flow downstream of the fluid pressure regulator; and selectively dispensing the confined fluid by opening the fluid flow path to fluid flow downstream of the fluid pressure regulator, and discharging fluid at a rate determined by the fluid pressure regulator;

wherein the fluid pressure regulator is arranged for discharge of fluid to the fluid flow path at a subatmospheric pressure.

28. A method according to claim 16, wherein the fluid pressure regulator is arranged for discharge of fluid to the fluid flow path at a pressure below 700 Torr.

29. A method of manufacturing a semiconductor product, comprising:

containing the fluid in a confined state against a fluid pressure regulator in a fluid flow path closed to fluid flow downstream of the fluid pressure regulator;

selectively dispensing the confined fluid by opening the fluid flow path to fluid flow downstream of the fluid pressure regulator, and discharging fluid at a rate determined by the fluid pressure regulator;

using the discharged fluid in the manufacture of the semiconductor product;

wherein the fluid pressure regulator is arranged for discharge of fluid to the fluid flow path at a subatmospheric pressure.

30. A method according to claim 18, wherein the fluid pressure regulator is arranged for discharge of fluid to the fluid flow path at a pressure below 700 Torr.

31. A fluid storage and dispensing system, comprising:
a fluid storage and dispensing vessel enclosing an interior volume for holding a fluid, wherein the vessel includes a fluid flow port;
a fluid at superatmospheric pressure in said interior volume;
a fluid dispensing assembly coupled in fluid flow communication with the port;
a fluid pressure regulator associated with the port, and arranged to maintain a predetermined pressure of gas discharged from the vessel, deriving from fluid in the interior volume of the vessel so that gas is discharged from the vessel at pressure lower than said superatmospheric pressure;
the fluid dispensing assembly comprising a flow control element which is selectively actuatable to flow gas, deriving from the fluid in the interior volume of the vessel, along a flow path through the fluid pressure regulator and fluid dispensing assembly, for discharge of the gas from the vessel, so that gas during said discharge flows through the fluid pressure regulator prior to flow through the flow control element.

32. A fluid storage and dispensing system according to claim 31, wherein said fluid comprises a fluid species selected from the group consisting of hydrides, halides, etch gases, and cleaning reagents for semiconductor manufacturing equipment.

33. A fluid storage and dispensing system according to claim 31, wherein said fluid comprises a fluid species selected from the group consisting of arsine, phosphine, stibine, silane, chlorosilane, diborane, and boron trifluoride.

34. A fluid storage and dispensing apparatus, comprising:
a fluid storage and dispensing vessel having a neck defining a port of the vessel;
a gas regulator mounted in the port, and set to a predetermined pressure level, for dispensing of gas, deriving from fluid in said vessel, at the predetermined pressure level; and
a valve head joined to the neck of the vessel, said valve head including a valve that is selectively openable or closable, arranged so that gas during said dispensing flows through the fluid pressure regulator prior to flow through the valve, to control dispensing of gas at the predetermined pressure level for which the gas regulator is set.

35. The fluid storage and dispensing apparatus of claim 34, containing a fluid for semiconductor manufacturing.

36. The fluid storage and dispensing apparatus of claim 34, having a single seam at the port.

37. The fluid storage and dispensing apparatus of claim 34, wherein at least a portion of the regulator is within the neck of the vessel.

38. The fluid storage and dispensing apparatus of claim 34, wherein at least a portion of the regulator is in the interior volume of the vessel.

39. The fluid storage and dispensing apparatus of claim 34, wherein the valve of the valve head comprises an automatic valve.

40. The fluid storage and dispensing apparatus of claim 34, wherein the valve of the valve head comprises a manual valve.

41. The fluid storage and dispensing apparatus of claim 34, containing a fluid comprising a hydride gas.

42. The fluid storage and dispensing apparatus of claim 34, containing a fluid comprising an acid gas.

43. The fluid storage and dispensing apparatus of claim 34, containing a fluid comprising a fluid species selected from the group consisting of arsine, phosphine, stibine, silane, and diborane.

44. The fluid storage and dispensing apparatus of claim 34, further comprising a gas-permeable liquid barrier arranged to prevent liquid contact with the gas regulator.

45. The fluid storage and dispensing apparatus of claim 34, wherein the gas regulator comprises a poppet element that is biased to a seat structure to prevent flow at a pressure above the predetermined pressure level.

46. The fluid storage and dispensing apparatus of claim 34, wherein the gas regulator is a fixed set point device.

47. The fluid storage and dispensing apparatus of claim 34, wherein the gas regulator is a variable set point device.

48. The fluid storage and dispensing apparatus of claim 34, wherein said valve head comprises an electrical valve.

49. The fluid storage and dispensing apparatus of claim 34, wherein said valve head comprises a pneumatic valve.

50. The fluid storage and dispensing apparatus of claim 34, wherein said vessel comprises a single port.

51. The fluid storage and dispensing apparatus of claim 34, further comprising a valve actuator for said valve.

52. The fluid storage and dispensing apparatus of claim 51, further comprising a central processor unit coupled in controlling relationship with the valve actuator to modulate flow of gas in said dispensing thereof.

53. The fluid storage and dispensing apparatus of claim 52, wherein the central processor unit is linked in monitoring relationship to a process facility wherein dispensed gas is consumed, to monitor a process condition of said facility and to responsively actuate the valve actuator to modulate flow of gas to the facility in correspondence to requirements of said facility for said gas.

54. The fluid storage and dispensing apparatus of claim 53, wherein the process facility comprises a semiconductor manufacturing facility.

55. The fluid storage and dispensing apparatus of claim 52, wherein the central processor unit is linked in thermal monitoring relationship to the vessel to correspondingly adjust the flow of gas to compensate the flow of gas in relation to temperature of the vessel.

56. The fluid storage and dispensing apparatus of claim 34, containing a fluid comprising arsine.

57. The fluid storage and dispensing apparatus of claim 34, containing a fluid comprising phosphine.

58. The fluid storage and dispensing apparatus of claim 34, containing a fluid comprising stibine.

59. The fluid storage and dispensing apparatus of claim 34, containing a fluid comprising silane.

60. The fluid storage and dispensing apparatus of claim 34, containing a fluid comprising diborane.

61. The fluid storage and dispensing apparatus of claim 34, containing a fluid comprising boron trichloride.

62. The fluid storage and dispensing apparatus of claim 34, containing a fluid comprising boron trifluoride.

63. The fluid storage and dispensing apparatus of claim 34, containing a fluid comprising a halide.

64. The fluid storage and dispensing apparatus of claim 34, containing a fluid comprising a cleaning reagent.

65. The fluid storage and dispensing system of claim 1, wherein said vessel comprises a neck bounding said fluid flow port.

66. The fluid storage and dispensing system of claim 65, wherein at least a portion of the fluid pressure regulator is within the neck of the vessel.

67. The fluid storage and dispensing system of claim 65, wherein at least a portion of the fluid pressure regulator is in the interior volume of the vessel.

68. The fluid storage and dispensing system of claim 1, wherein said interior volume of the vessel does not contain a heater.

69. The fluid storage and dispensing system of claim 1, wherein the fluid pressure regulator is set to a subatmospheric predetermined pressure level.

70. The fluid storage and dispensing system of claim 1, wherein the fluid pressure regulator is set to an atmospheric predetermined pressure level.

71. The fluid storage and dispensing system of claim 1, wherein the fluid pressure regulator is set to a superatmospheric predetermined pressure level.

72. The fluid storage and dispensing system of claim 1, wherein said fluid comprises gas.

73. The fluid storage and dispensing system of claim 1, wherein said fluid comprises liquefied gas.

74. The fluid storage and dispensing system of claim 1, further comprising a central processor unit coupled in controlling relationship with the flow control element to modulate flow of gas in said discharge thereof.

75. The fluid storage and dispensing system of claim 1, wherein said fluid storage and dispensing vessel comprises a vertically elongate generally cylindrical vessel.

* * * * *